United States Patent [19]
Morel et al.

[11] Patent Number: 5,995,362
[45] Date of Patent: Nov. 30, 1999

[54] SUPPORT AND ELECTRICAL POWER SUPPLY DEVICE FOR ELECTRICAL SWITCHGEAR

[75] Inventors: Robert Morel, Eybens; Henri Auoue, Saint Martin D'Uriage; Jean-Jacques Kuntz, Saint Egreve; Philippe Romanet-Perroux, Eybens, all of France

[73] Assignee: Schneider Electric SA, France

[21] Appl. No.: 08/943,197

[22] Filed: Oct. 3, 1997

[30] Foreign Application Priority Data

Oct. 18, 1996 [FR] France ................................. 96 12927

[51] Int. Cl.[6] .............................. H02B 1/04; H02B 1/20; H02B 1/26
[52] U.S. Cl. ......................... 361/647; 361/611; 361/624; 361/627; 361/628; 361/637; 361/643; 361/631
[58] Field of Search .................................. 361/600, 601, 361/622, 624, 627, 631, 637, 638, 643, 646, 647, 698, 650, 652, 673, 611, 628

[56] References Cited

U.S. PATENT DOCUMENTS

| | | | |
|---|---|---|---|
| 3,204,150 | 8/1965 | Gauthier | 361/673 |
| 3,211,960 | 10/1965 | Dorfman et al. | 361/373 |
| 3,293,503 | 12/1966 | Hermann et al. | 361/652 |
| 3,510,729 | 5/1970 | Gryctko et al. | 361/656 |
| 3,711,748 | 1/1973 | Dietz | 317/112 |
| 3,842,322 | 10/1974 | Leonard | 317/119 |
| 4,667,268 | 5/1987 | Mrowka | 361/353 |
| 5,046,173 | 9/1991 | Wall, Jr. | 361/353 |
| 5,067,043 | 11/1991 | Markowski et al. | 361/361 |
| 5,515,236 | 5/1996 | Nolan et al. | 361/652 |

FOREIGN PATENT DOCUMENTS

| | | |
|---|---|---|
| 349782 | 1/1990 | European Pat. Off. . |
| 1 946 714 | 3/1971 | Germany . |
| 79 23 422 | 4/1980 | Germany . |
| 34 09 211 | 9/1985 | Germany . |
| 90 17 385 | 3/1991 | Germany . |
| 195 06 056 | 8/1996 | Germany . |

*Primary Examiner*—Leo P. Picard
*Assistant Examiner*—Anatoly Vortman
*Attorney, Agent, or Firm*—Parkhurst & Wendel, L.L.P.

[57] ABSTRACT

A support and electrical power supply device comprises a mounting plate supporting an electrical switchgear apparatus and housing branch conductors extending perpendicularly to a busbar. The branch conductors present identical lengths. The connection strips are arranged close to the opposite terminal parts of the branch conductors and comprise orifices arranged symmetrically with respect to the horizontal midplane of the mounting plate to enable fitting of the connection parts with the lineside terminals or the loadside terminals of the switchgear apparatus. Two connection possibilities of the switchgear apparatus are possible at the time of installation to achieve a lineside or a loadside power supply. The same mounting plate can also be used for supply of a single switchgear apparatus or of two switchgear apparatuses with opposite feeders.

11 Claims, 10 Drawing Sheets

SUPPORT AND ELECTRICAL POWER SUPPLY DEVICE FOR ELECTRICAL SWITCHGEAR

BACKGROUND OF THE INVENTION

The invention relates to a support and electrical power supply device for a multipole electrical switchgear apparatus comprising a parallelipipedic mounting plate with a case made of molded insulating material designed to be fitted on the parallel collecting bars of a busbar and containing:

branch conductors presenting identical lengths and extending perpendicularly to the busbar in adjacent compartments of the case, each conductor comprising at least one electrical connection strip for connection with a corresponding terminal of the switchgear apparatus and a contact strip designed to come into engagement with the collecting bar of the corresponding phase, connecting parts for connection between the terminals of the switchgear apparatus and the connection strips of the branch conductors, and securing means to secure the contact strips against the collecting bars of the busbar.

Such a device is described in the document DE 3,409,211 in which the branch conductors are coplanar, requiring conducting shims to be fitted between the collecting bars of the busbar and the bottom face of the branch conductors. Connection between the terminals of the switchgear apparatus and the strips of the branch conductors is achieved by means of connecting cables.

Figure 1:
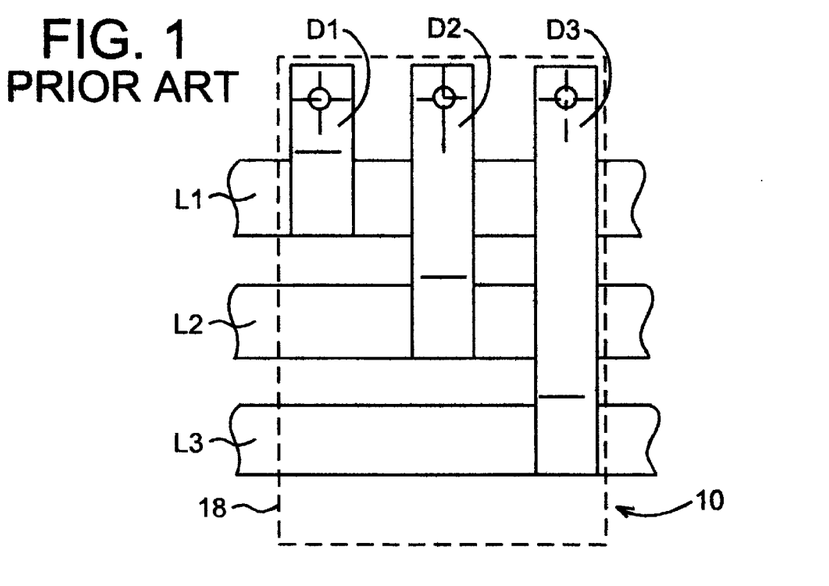
FIG. 1 is a schematic view of a support and electrical power supply device according to the prior art, the case of the mounting plate being represented by a broken line.
Figure 2:
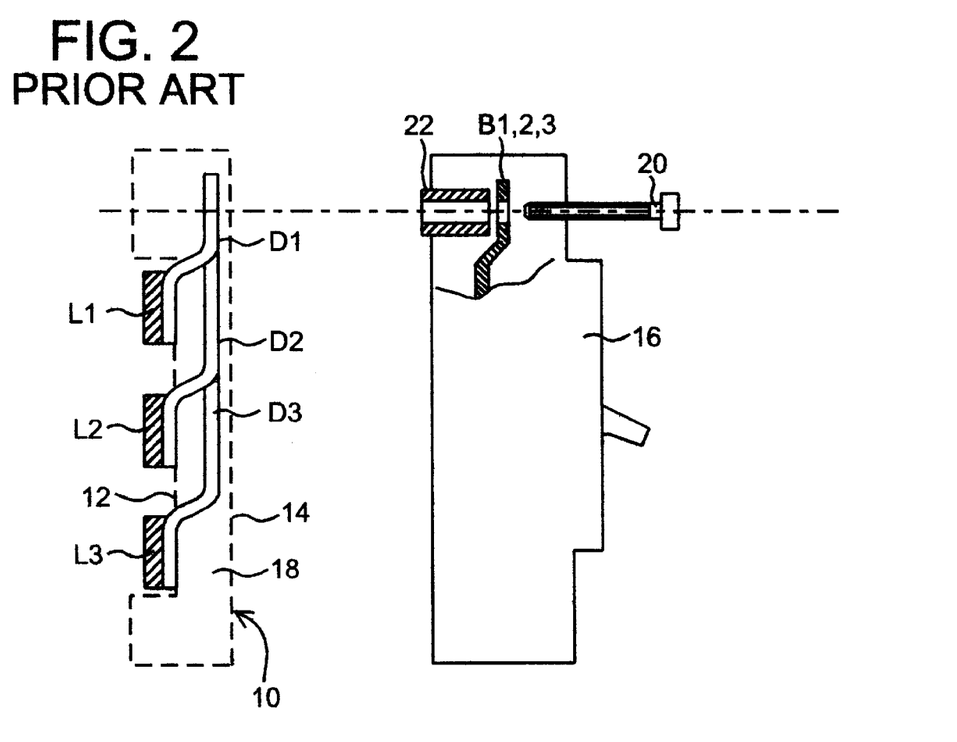
FIG. 2 shows a side view of the device of FIG. 1 when the switchgear apparatus is fitted onto the mounting plate.
Figure 3:
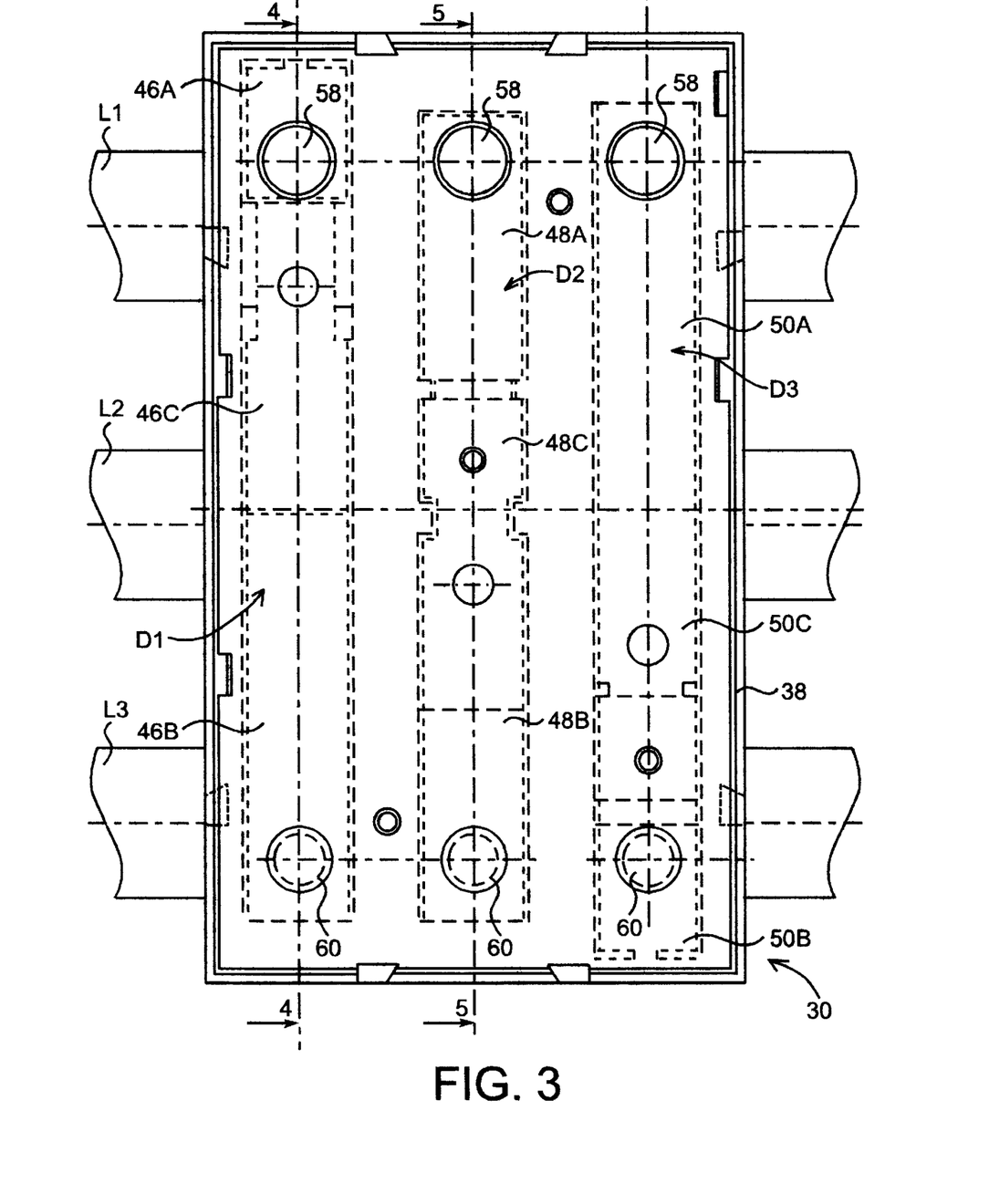
FIG. 3 is an elevational view of the support and electrical power supply device according to the invention.
Figure 4:
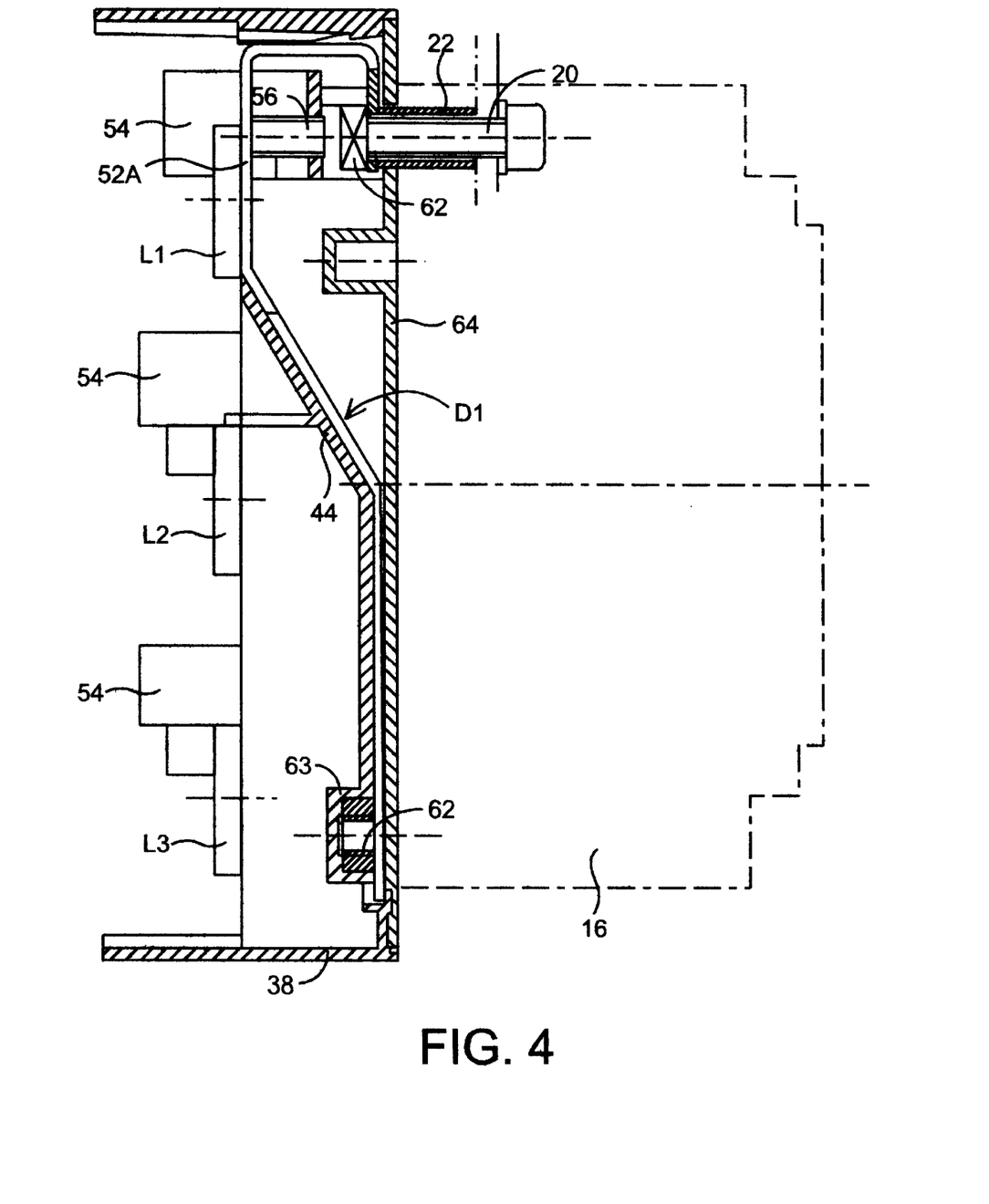
FIGS. 4 and 5 are cross-sectional views respectively along the lines 4—4 and 5—5 of FIG. 3.
Figure 5:
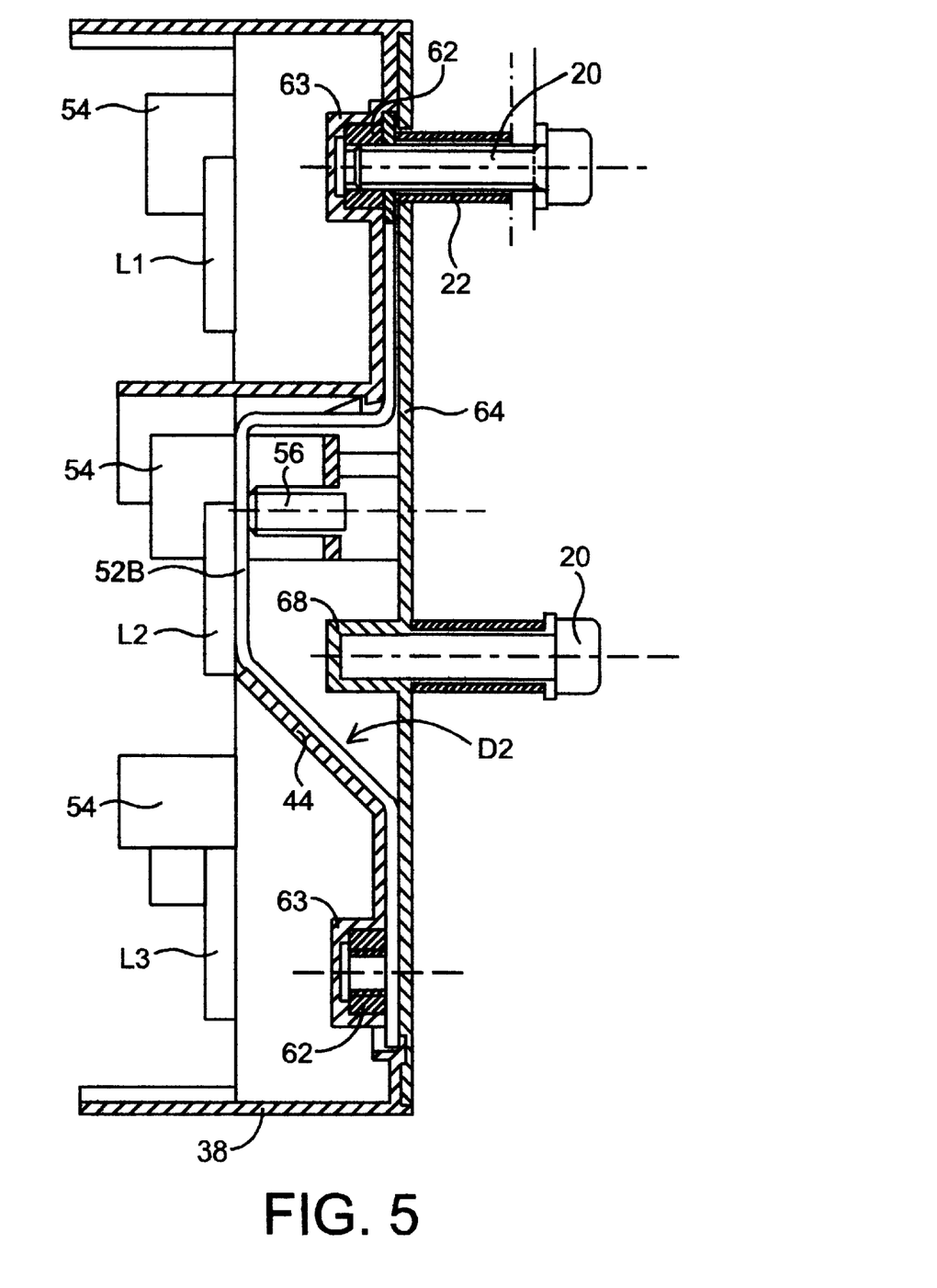
Figure 6:
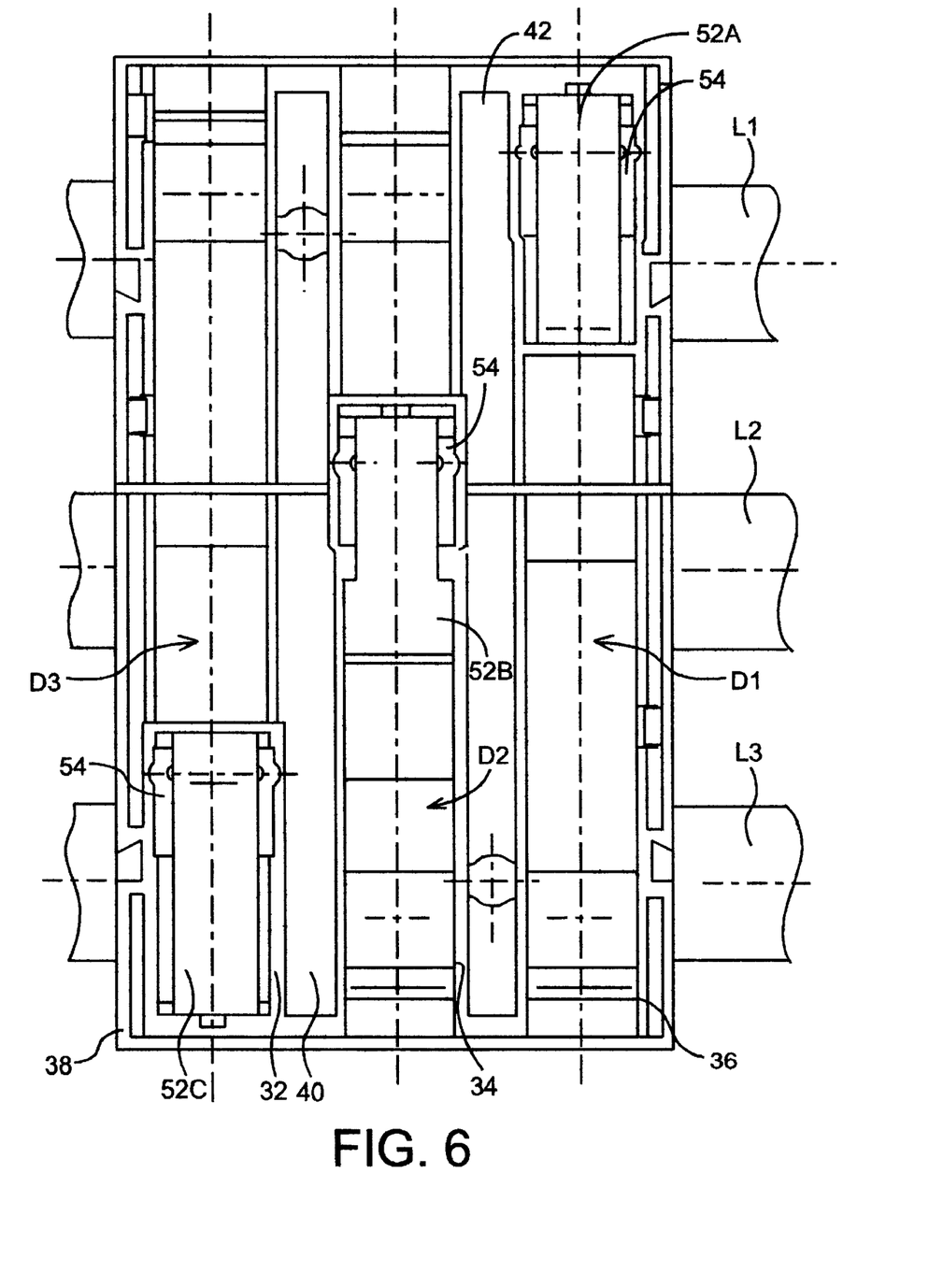
FIG. 6 is a bottom view of FIG. 3.
Figure 7:
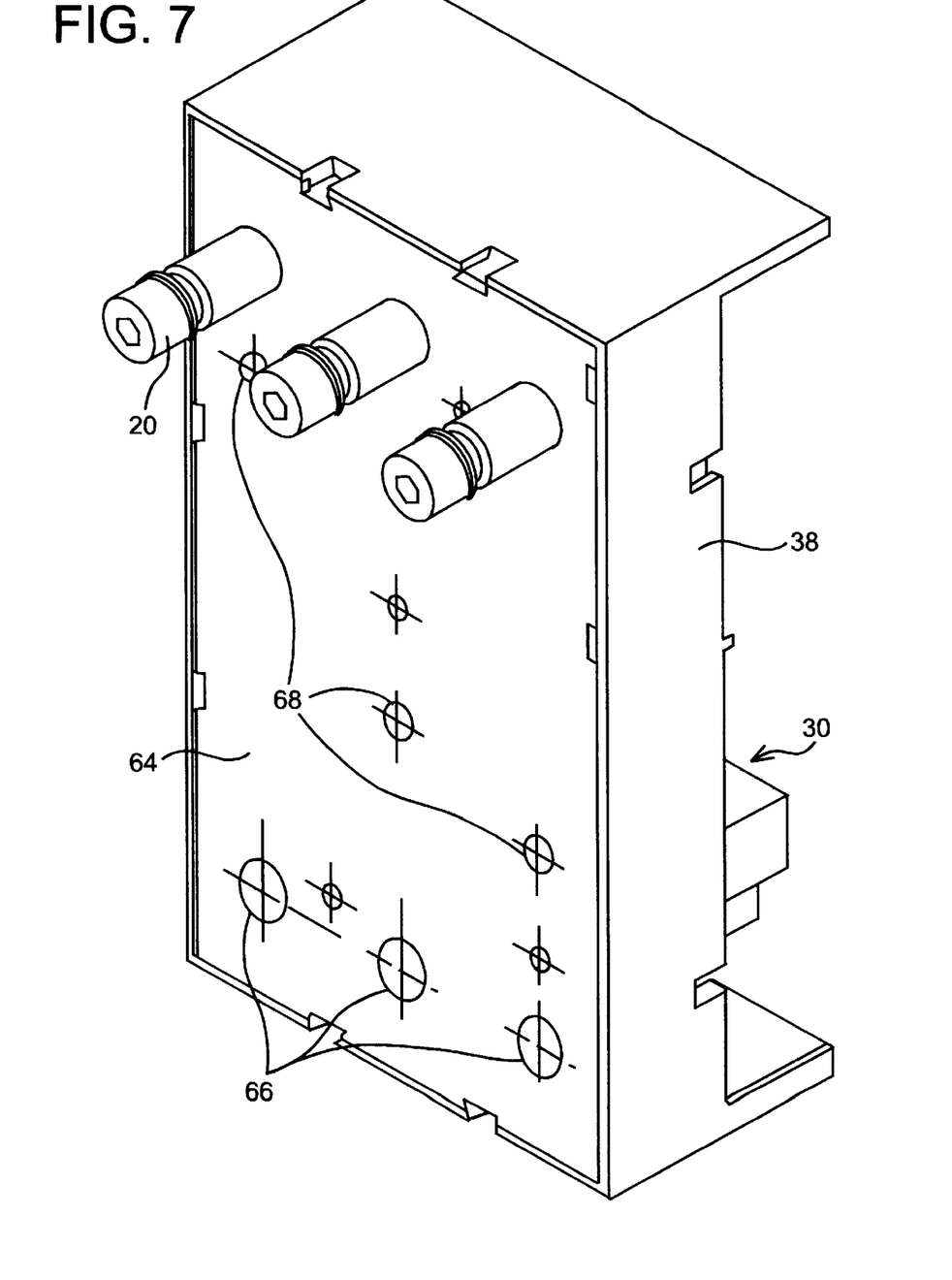
FIG. 7 represents a perspective view of the mounting plate of FIG. 3.

FIGS. 1 and 2 represent another support and power supply plate 10 of the prior art mounted at the level of the notched bottom face 12 on a three-phase busbar L1, L2, L3, and having an opposite top face 14 designed to receive an electrical apparatus 16, notably a circuit breaker. The collecting bars of the busbar L1, L2, L3 extend parallel to one another with a predetermined insulating offset and provide both mechanical support and electrical power supply of the apparatus 16. The mounting plate 10 comprises an insulating case 18 (in broken line) housing branch conductors D1, D2, D3 performing electrical connection between the collecting bars of the busbar L1, L2, L3 and the respective input terminals B1, B2, B3 of the poles of the apparatus 16. A system of screws 20 and spacers 22 performs the electrical connection between the terminals B1, B2, B3 and the branch conductors D1, D2, D3 of the mounting plate 10. The electrical connection between the branch conductors D1, D2, D3 and the collecting bars L1, L2, L3 is achieved by means of securing brackets (not represented) designed to clamp the branch conductors D1, D2, D3 against offset contact strips of the collecting bars L1, L2, L3. The branch conductors D1, D2, D3 are secured in individual compartments of the case 18 and present jointed shapes of different lengths extending perpendicularly to the collecting bars L1, L2, L3. The branch conductor D2 stops at the level of the bar L2 and the longest conductor D3 extends up to the bar L3. The connection strips for connection of the input terminals B1, B2, B3 with the branch conductors D1, D2, D3 are located appreciably in the same plane.

Side by side assembly of several mounting plates 10 is possible in the widthwise direction of the collecting bars L1, L2, L3 so as to form a low voltage distribution dispatcher.

Such a dissymmetry of the branch conductors D1, D2, D3 of this known mounting plate 10 requires precise positioning of the case 18 on the busbar L1, L2, L3 according to the choice of lineside or loadside feeders of the apparatus 16. In the case of FIG. 2, the power supply to the terminals B1, B2, B3 is performed lineside and the feeder is connected loadside. In the case of a lineside feeder, the mounting plate 10 has to be reversed one half-turn or the location of the branch conductors D1, D2, D3 in the respective compartments of the case 18 has to be modified. The possibilities of electrical distribution making use of such a mounting plate are limited to a given type of electrical installation and the connection possibilities are limited.

SUMMARY OF THE INVENTION

The object of the invention is to improve the connection possibilities of the electrical switchgear fitted on mounting plates to a power supply busbar.

The support and power supply device according to the invention is characterized in that:

said contact strips are situated in one and the same plane extending parallel to that of the connection strips with a predetermined offset, the connection strips are arranged close to the opposite terminal parts of the branch conductors and comprise orifices arranged symmetrically with respect to the horizontal midplane of the mounting plate to enable fitting of the connection parts with the lineside terminals or the loadside terminals of the switchgear apparatus, said electrical connection parts comprising conducting spacers of tubular shapes arranged between said lineside or roadside terminals and the corresponding connection strips of the branch conductors, fixing being achieved by means of clamping screws passing respectively through said terminals, the spacers and the associated orifices.

Two connection possibilities of the apparatus are thus possible on the mounting plate to achieve a lineside or loadside power supply. This choice can be made at the time of installation by fitting the connection parts at a predetermined location.

According to a preferred embodiment, the branch conductors are protected by an insulating cover plate covering the whole upper surface of the mounting plate and having detachable covers facing the orifices for passage of the connection parts.

According to a feature of the invention, the securing means comprise brackets straddling each branch conductor at the level of the contact strip, each bracket being provided with a half-open notch designed to latch onto the rear of the corresponding collecting bar following the clamping action of a fixing screw.

According to a development of the invention, the mounting plate is used for supplying two switchgear apparatuses with opposite feeders.

The same basic mounting plate can thus be used to achieve two types of distributors, one enabling the choice of lineside or roadside connection of one switchgear apparatus and the other enabling common power supply of at least one pair of switchgear apparatuses with double feeders.

The case of the multipole mounting plate can be formed by a monoblock or modular structure.

BRIEF DESCRIPTION OF THE DRAWINGS

Other advantages and features will become more clearly apparent from the following description of an embodiment of the invention given as a non-restrictive example only and represented in the accompanying drawings in which.

DETAILED DESCRIPTION OF THE PREFERRED EMBODIMENT

With reference to FIGS. 3 to 7, the support and electrical power supply device comprises a mounting plate designated by the general reference number 30 and equipped with three branch conductors D1, D2, D3 connectable to a three-phase busbar L1, L2, L3. The three conductors D1, D2, D3 present the same lengths and are arranged in parallel at regular intervals in adjacent compartments 32, 34, 36 of the parallelepipedic case 38 made of molded insulating material. The different elementary compartments 32, 34, 36 are separated from one another by vertical sub-dividing partitions 40, 42 and each comprise bearing surfaces 44 for positioning of the branch conductors D1, D2, D3. The length of the branch conductors D1, D2, D3 is in the example described greater than the distance separating the end collecting bars L1, L3. The lengths of the conductors can naturally be close to the distance separating the bars L1 and L3.

Each branch conductor D1, D2, D3 is formed by a small elongated bar of rectangular cross-section comprising two opposite coplanar parts 46A, 46B; 48A, 48B; 50A, 50B equipped with connection strips for connection with the terminals of the switchgear and a deformed intermediate part 46C; 48C; 50C having a contact strip 52A, 52B, 52C designed to come into engagement with the corresponding collecting bar of the busbar L1, L2, L3. The contact strips 52A, 52B, 52C are accessible from the side where the busbars L1, L2, L3 are situated and are offset from one another in the longitudinal direction by a distance separating the collecting bars L1, L2, L3. The contact strips 52A, 52B, 52C are moreover located in the same plane parallel to that of the terminal parts 46A, 46B; 48A, 48B; 50A, 50B.

A reverse 6U-shaped securing bracket 54 straddles each branch conductor D1, D2, D3 at the level of the contact strip 52A, 52B, 52C and comprises a half-open slot designed to latch onto the rear of the corresponding collecting bar L1, L2, L3 to keep the latter in engagement with the contact strip 52A, 52B, 52C. Clamping is performed by means of a fixing screw 56 screwed into a tapped hole on the upper face of the bracket 54, and whose end bears directly on the contact strip 52A, 52B, 52C.

The connection terminals of the terminal parts 46A, 46B; 48A, 48B; 50A, 50B of each branch conductor D1, D2, D3 are provided with orifices 58, 60 designed to cooperate with the clamping screw 20 of the terminals B1, B2, B3 of the switchgear. The orifices 58, 60 can be threaded or be associated to nuts 62 soldered onto the strips, or positioned in hexagonal housings 63 of the case 38. The orifices 58 situated in the upper part of the mounting plate 30 are aligned in a direction perpendicular to the branch conductors D1, D2, D3. The opposite orifices 60 extend along the lower part of the mounting plate 30 to enable power supply from loadside.

The orifices 58, 60 of the branch conductors D1, D2, D3 are, in the example described, symmetrical with respect to the horizontal mid-plane of the mounting plate 30. In the fitted position of the mounting plate 30 on the busbar L1, L2, L3, the orifices 58, 60 are advantageously also symmetrical with respect to the center bar L2.

An insulating cover plate 64 covers the whole upper surface of the mounting plate 30 hiding the branch conductors D1, D2, D3. Detachable covers 66 (FIG. 7) are provided in the cover plate 64 facing the orifices 58, 60 of the branch conductors D1, D2, D3. The cover plate 64 in addition comprises blind holes 68 arranged in the middle zone for storing the clamping screws 20 before installation.

The branch conductors D1 and D3 present identical structures but are reversed a half-turn one from the other when they are fitted in the external compartments of the case 38.

Figure 8:
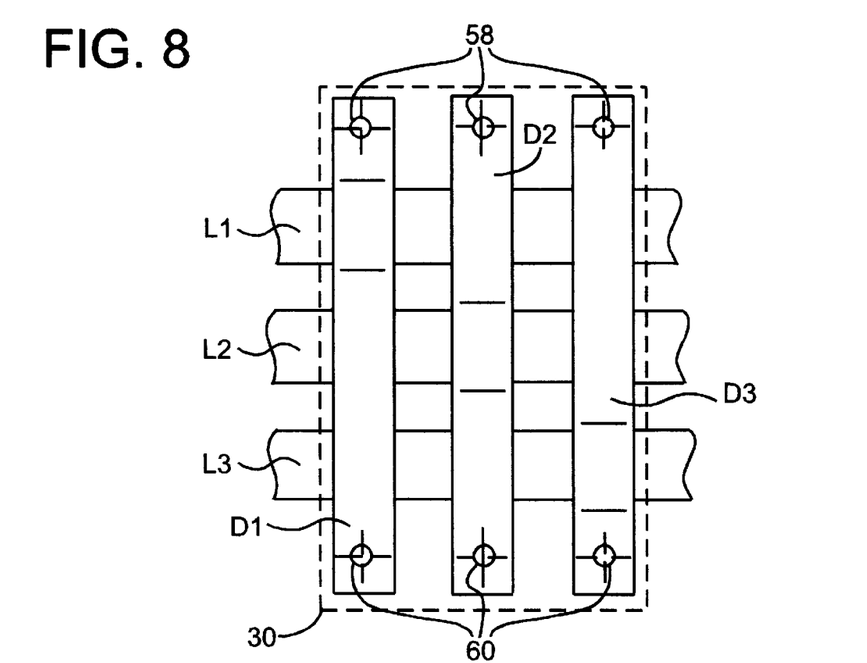
FIGS. 8 and 9 are identical views to FIGS. 1 and 2, with the mounting plate according to FIG. 4.
Figure 9:
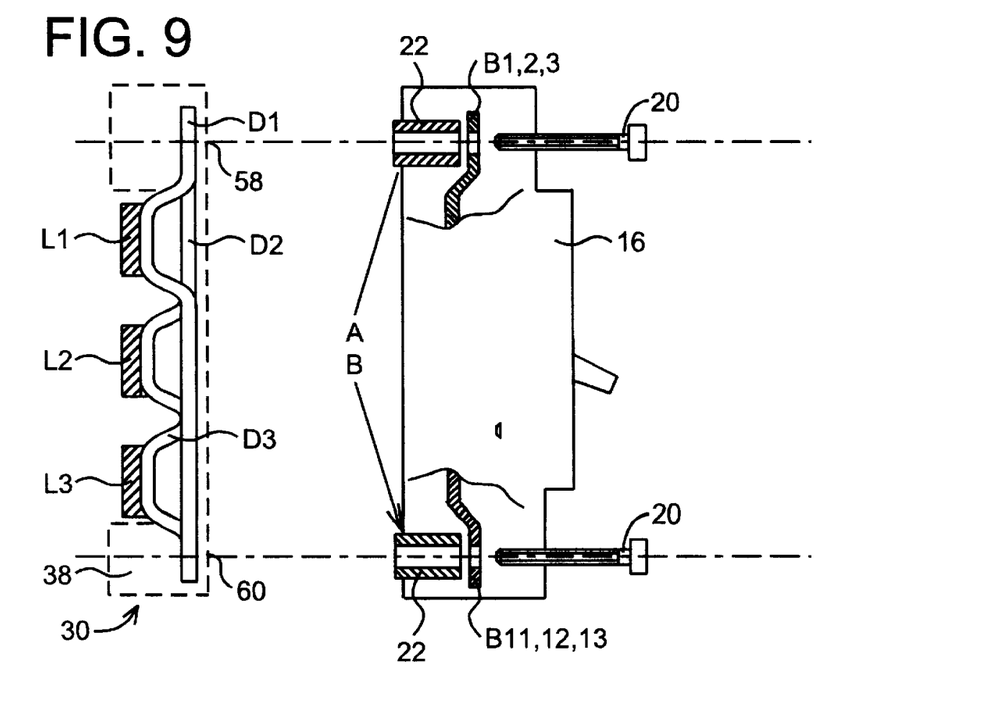
Figure 10:
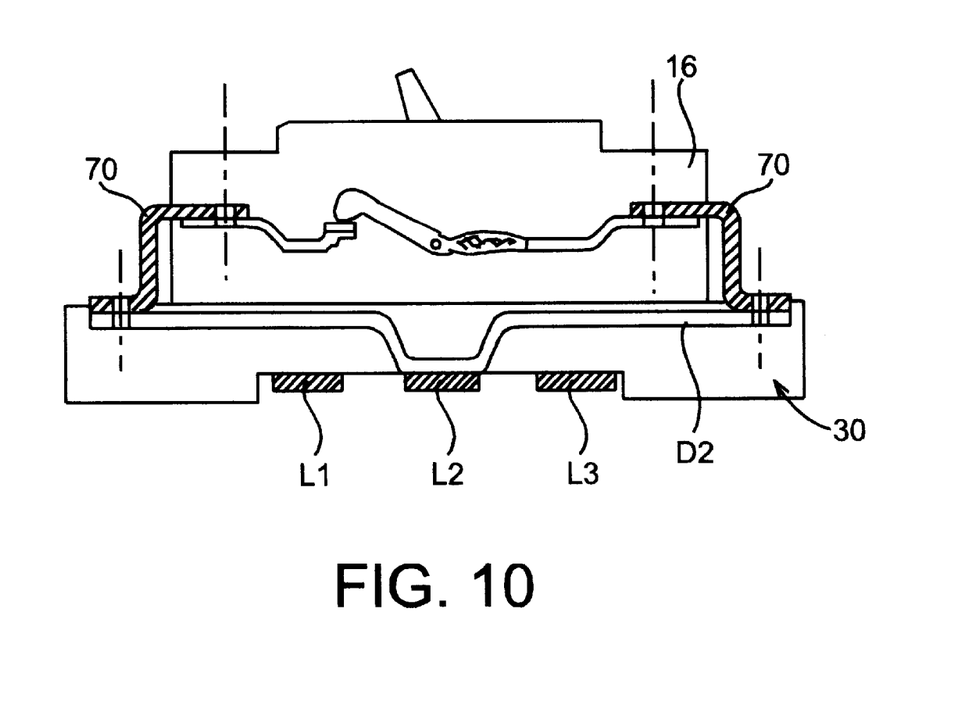
FIG. 10 is an identical view to FIG. 4 of an alternative embodiment.

The symmetrical arrangement of the orifices 58, 60 of the mounting plate 30 enables the choice to be made in the installation phase after fitting on the busbar L1, L2, L3 between a connection with the lineside terminals B1, B2, B3 or the down line terminals B11, B12, B13 of the switchgear apparatus 16 (FIGS. 8 and 9). The location A or B of the connecting parts between the connection strips of the roadside and lineside terminals and the orifices 58 and 60 of the mounting plate 30 simply has to be chosen. The connecting parts made of conducting material can be tubular spacers 22 (FIG. 9) or brackets 70 (FIG. 10).

The terminals B1, B2, B3; B11, B12, B13 of the switchgear apparatus 16 can advantageously be of the type described in the document EP-A-0,555,157.

The location A of the connecting spacers 22 corresponds to a power supply of the switchgear apparatus from lineside and to roadside feeders by means of the terminals B11, B12, B13. The covers 66 of the upper edge of the cover plate 64 are broken to allow passage of the connecting screws 20. The covers 66 of the bottom edge of the cover plate 64 are left in place, the feeders being achieved directly by cables (not represented) inserted into the terminals B11, B12, B13. The spacers of the location B are not used in this type of installation.

In the opposite case of power supply of the switchgear apparatus 16 from loadside, the spacers 22 are provided only at the location B and not at A. The feeders are connected lineside by means of the terminals B1, B2, B3, and only the top covers 66 are left in place on the cover plate 64.

The choice of power supply of the switchgear apparatus 16 from lineside or loadside (FIG. 9) is made when the mounting plate 30 is fitted on the busbar L1, L2, L3 and does not require the cover plate 64 to be disassembled, or the case 38 to be turned.

Figure 11:
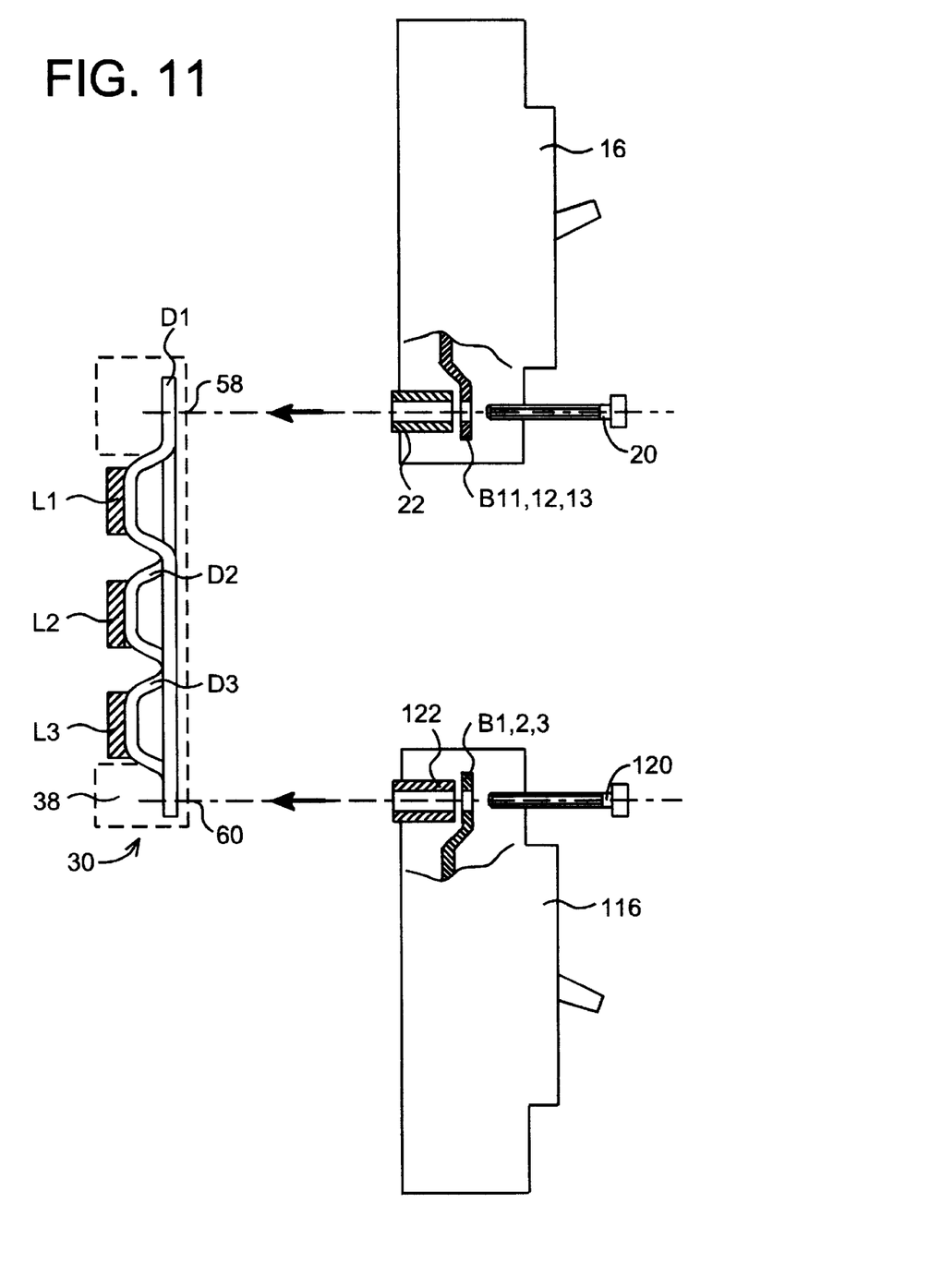
FIG. 11 represents another use of the mounting plate according to the invention.

With reference to FIG. 11, the mounting plate 30 according to FIGS. 1 to 7 can be used for electrical power supply of two switchgear apparatuses 16, 116 fitted head-to tail. The apparatus 16 has a loadside power supply using the location B of the spacers 22 and insertion of the screws 20 in the upper orifices 58 of the branch conductors D1, D2, D3. The other apparatus 116 is provided with an lineside power supply using the location A of the spacers 122 and passage of the screws 120 in the lower orifices 60 of the mounting plate 30. In this case of application, the use of two series of spacers 22 and 122 enables a distribution system to be obtained with double feeders on the same level with a single mounting plate 30.

Figure 12:
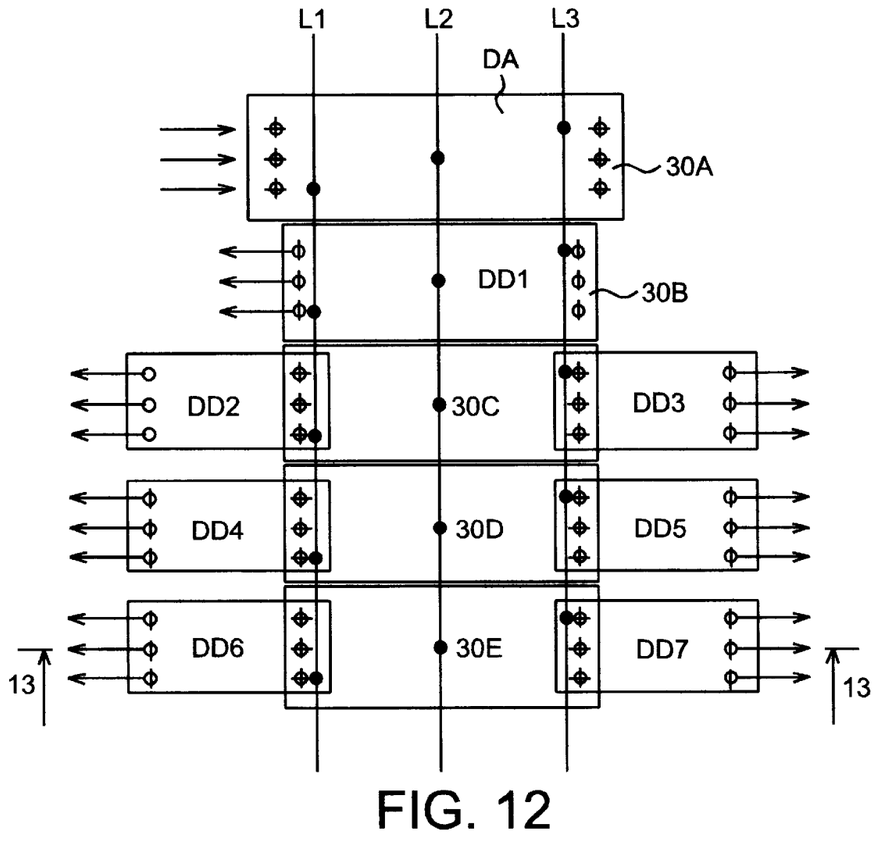
FIG. 12 shows an electrical installation arranged as a vertical distributor with stacking of several mounting plates.
Figure 13:
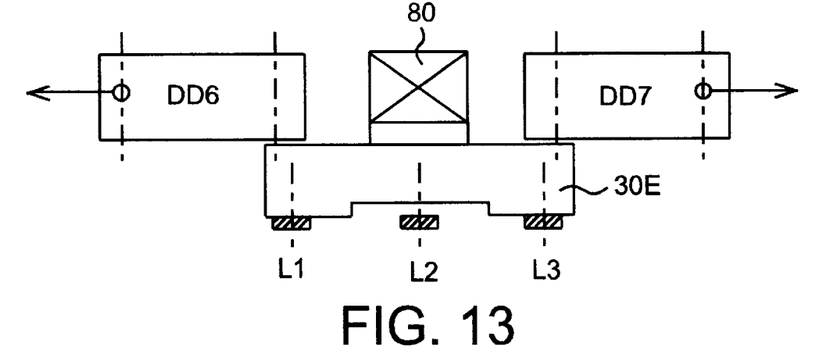
FIG. 13 is a cross-sectional view along the line 13—13 of FIG. 12.

FIGS. 12 and 13 show a three-phase electrical installation arranged as a vertical distributor with stacking of a plurality of mounting plates 30A, 30B, 30C, 30D, 30E on the busbar L1, L2, L3. The top mounting plate 30A is larger than the other mounting plates and supports the main circuit breaker D1 which supplies and protects the busbar L1, L2, L3. The second mounting plate 30B placed under the top mounting plate 30A is equipped with a circuit breaker DD1 with a feeder of the type represented in FIG. 9. Each of the following mounting plates 30C, 30D, 30E feeds two head-to-tail mounted circuit breakers DD2, DD3; DD4, DD5; DD6; DD7 of the type illustrated in FIG. 11.

The free center volume between the circuit breakers DD2, DD3; DD4, DD5; DD6; DD7 is advantageously used for fitting a trunking 80 for running wiring, notably the conductors of the electrical indication and tripping auxiliaries housed in the circuit breakers. The trunking 80 extends vertically along the direction of stacking of the mounting plates 30C, 30D, 30E.

The mounting plate 30 according to FIGS. 3 to 7 is of the three-pole type with a monoblock case 38. It is naturally possible to add thereto a neutral module equipped with a branch conductor to form a four-pole mounting plate suitable for a three-phase and distributed neutral power system. The neutral module can be placed to the right of to the left of the case 38.

According to another alternative embodiment (not represented), the mounting plate can be formed by side by side assembly of several single-pole modules of identical structures. It is also possible to constitute two-pole, three-pole or four-pole mounting plates with the same modular elements.

We claim:

1. A support and electrical power supply device for a multipole electrical switchgear apparatus comprising a parallelopipedic mounting plate with a case made of molded insulating material designed to be fitted on parallel collecting bars of a busbar and containing:
   branch conductors presenting identical lengths and extending perpendicularly to the busbar in adjacent compartments of the case, each conductor comprising at least one electrical connection strip for connection with a corresponding terminal of the switchgear apparatus and a contact strip designed to come into engagement with a collecting bar corresponding to one electrical service phase,
   connecting parts for connection between terminals of the switchgear apparatus and connection strips of the branch conductors,
   securing means to secure contact strips against the collecting bars of the busbar, said contact strips being situated in one and the same plane extending parallel to a plane containing the connection strips with a predetermined offset, wherein the connection strips are arranged close to opposite terminal parts of the branch conductors, said electrical connecting parts comprising conducting spacers arranged between lineside or loadside terminals and the corresponding connection strips of the branch conductors,
   and the securing means comprising brackets straddling each branch conductor at a level of a contact strip, each bracket being designed to latch onto the rear of a corresponding collecting bar and the length of the branch conductors is greater than the distance separating the two end collecting bars of the busbar.

2. The device according to claim 1, wherein fixing of the securing means comprise clamping screws passing through the respective terminals of the switchgear apparatus, the spacers, and the associated orifices.

3. The support and electrical power supply device according to claim 2, wherein the branch conductors are protected by an insulating cover plate which covers an entire upper surface of the mounting plate and has detachable covers facing the orifices for passage of connecting parts.

4. The support and electrical power supply device according to claim 3, wherein the insulating cover plate includes blind holes arranged in a center zone between two series of covers for storing securing screws.

5. The support and electrical power supply device according to claim 1, wherein the electrical connecting parts are brackets fixed in the terminals of the switchgear apparatus and on the connection strips of the branch conductors.

6. The device according to claim 1, wherein each bracket includes an half-open notch for latching onto the rear of a corresponding collecting bar.

7. The device according to claim 1 wherein the conducting spacers are of tubular shape.

8. An electrical distribution and dispatching installation comprising at least one support and electrical power supply device for a multipole electrical switchgear apparatus comprising a parallelopipedic mounting plate with a case made of molded insulating material designed to be fitted on parallel collecting bars of a busbar and containing:
   branch conductors extending perpendicularly to the busbar in adjacent compartments of the case, each conductor comprising at least one electrical connection strip for connection with a corresponding terminal of the switchgear apparatus and a contact strip designed to come into engagement with a collecting bar corresponding to one electrical phase,
   connecting parts for connection between terminals of the switchgear apparatus and connection strips of the branch conductors,
   and securing means to secure contact strips against the collecting bars of the busbar, said contact strips being situated in one and the same plane extending parallel to a plane containing the connection strips with a predetermined offset,
   wherein the connection strips are arranged close to opposite terminal parts of the branch conductors of same lengths, and the same mounting plate can receive as required a single apparatus or two apparatuses with opposite feeders, and the securing means comprising brackets straddling each branch conductor at a level of the contact strip to latch onto the rear of a corresponding collecting bar and the length of the branch conductors is treater than the distance separating the two end collecting bars of the busbar.

9. The electrical distribution and dispatching installation according to claim 8, arranged as a vertical distributor, wherein the distributor comprises a plurality of mounting plates stacked on one another along the busbar and designed to supply two rows of circuit breakers separated from one another by a center space in which a trunking extends to run wiring.

10. The installation according to claim 8 wherein the connection strips comprise orifices arranged symmetrically with respect to a horizontal midplane of the mounting plate to enable connection of the connecting parts with lineside or loadside terminals of the switchgear apparatus.

11. The installation according to claim 8 wherein each bracket includes an half-open notch.

* * * * *